US012621303B2

(12) United States Patent (10) Patent No.: US 12,621,303 B2
Kim et al. (45) Date of Patent: May 5, 2026

(54) METHOD AND APPARATUS FOR TRANSFERRING QUALIFICATION INFORMATION

(71) Applicant: KAKAO CORP., Jeju-si (KR)

(72) Inventors: Chun Ho Kim, Seongnam-si (KR);
Yong Ha Yoo, Seongnam-si (KR); Woo Young Park, Seongnam-si (KR);
Myung Jun Kim, Seongnam-si (KR)

(73) Assignee: KAKAO CORP., Jeju-Si (KR)

( * ) Notice: Subject to any disclaimer, the term of this patent is extended or adjusted under 35 U.S.C. 154(b) by 497 days.

(21) Appl. No.: 17/842,805

(22) Filed: Jun. 17, 2022

(65) Prior Publication Data

US 2022/0407860 A1 Dec. 22, 2022

(30) Foreign Application Priority Data

Jun. 18, 2021 (KR) ......................... 10-2021-0079584

(51) Int. Cl.
*H04L 9/40* (2022.01)
(52) U.S. Cl.
CPC ............ *H04L 63/102* (2013.01); *H04L 63/08* (2013.01)
(58) Field of Classification Search
CPC ....... H04L 63/102; H04L 63/08; H04L 63/20; H04L 9/32; H04W 12/06
See application file for complete search history.

(56) References Cited

U.S. PATENT DOCUMENTS

| | | | | | |
|---|---|---|---|---|---|
| 11,403,711 | B1 * | 8/2022 | Ross | ...................... | G06Q 40/08 |
| 2006/0242427 | A1 * | 10/2006 | Ruzyski | .............. | H04L 63/0861 |
| | | | | | 726/19 |
| 2012/0016896 | A1 * | 1/2012 | Butt | ................... | G06Q 20/4016 |
| | | | | | 707/E17.135 |

(Continued)

FOREIGN PATENT DOCUMENTS

| | | |
|---|---|---|
| JP | 2002-351842 A | 12/2002 |
| JP | 2017-102842 A | 6/2017 |

(Continued)

OTHER PUBLICATIONS

Cheng Tianxiang et al. ("Tianxiang," CN 1118961382A, published Oct. 30, 2020, Machine Translation, pp. 1-32) (Year: 2020).*

(Continued)

*Primary Examiner* — Luu T Pham
*Assistant Examiner* — Canh Le
(74) *Attorney, Agent, or Firm* — Banner & Witcoff, Ltd.

(57) ABSTRACT

Provided is a method of providing a qualification authentication result performed by a user terminal, the method including receiving a qualification authentication request for a user of the user terminal from an external device, performing access authentication to authentication information of a user account of the user in response to a selection input for the received qualification authentication request, and in response to the access authentication being successful, providing the external device with a qualification authentication result obtained by searching for target qualification information indicated by the qualification authentication request among qualification information registered in the authentication information of the user account.

20 Claims, 6 Drawing Sheets

(56) References Cited

U.S. PATENT DOCUMENTS

| | | | | |
|---|---|---|---|---|
| 2013/0191161 A1* | 7/2013 | Churchwell | ........... | G16H 10/60 |
| | | | | 705/3 |
| 2016/0012412 A1* | 1/2016 | Scanlon | ........... | G06Q 20/40145 |
| | | | | 705/44 |
| 2019/0044940 A1* | 2/2019 | Khalil | ................... | H04L 9/3247 |
| 2019/0303546 A1* | 10/2019 | Siavoshy | ................ | G06F 21/62 |
| 2021/0258308 A1* | 8/2021 | Avetisov | ............... | H04L 9/0825 |
| 2021/0342472 A1* | 11/2021 | Forman | ................... | G06F 21/31 |
| 2021/0409354 A1* | 12/2021 | Jang | ........................ | H04L 51/18 |
| 2022/0392637 A1* | 12/2022 | Kollada | ................. | G16H 50/30 |
| 2023/0214715 A1* | 7/2023 | Cheng | ..................... | G06N 7/01 |
| | | | | 706/12 |

FOREIGN PATENT DOCUMENTS

| | | |
|---|---|---|
| JP | 2018-32125 A | 3/2018 |
| JP | 2020-96244 A | 6/2020 |
| KR | 10-2216653 B1 | 2/2021 |

OTHER PUBLICATIONS

Liu, Xin, Machine Translation CN 109636429, Pub. Apr. 16, 2019, pp. 1-14. (Year: 2019).*

Sarah Aragon Bartsch, "A day in the Life: Exploring the use of Scheduled Mobile Chat Messages for Career Guidance," 2021, pp. 1-12. (Year: 2021).*

Yusuke Nobu et al., "Implementation of A User Account Provisioning System Based on NFC for Public Wi-Fi Services," 2015 pp. 114-117 (Year: 2015).*

Korean Office Action for KR Application No. 10-2021-0079584 mailed on Nov. 29, 2022.

Jul. 3, 2023—Japanese Notice of Reasons for Refusal—JP 2022-097553.

* cited by examiner

METHOD AND APPARATUS FOR TRANSFERRING QUALIFICATION INFORMATION

CROSS-REFERENCE TO RELATED APPLICATION

This application claims the benefit of Korean Patent Application No. 10-2021-0079584 filed on Jun. 18, 2021, in the Korean Intellectual Property Office, the entire disclosure of which is incorporated herein by reference for all purposes.

BACKGROUND

1. Field of the Invention

One or more example embodiments relate to a method and apparatus for transferring qualification information.

2. Description of the Related Art

Recently, with development of mobile smart devices, the use of online platform services for interaction with other users through networks is increasing. Typical examples of the online platform services for interaction with other users include a social networking service (SNS), which is an online platform that creates and strengthens social relationships through communication, information sharing, and network expansion between users, and an instant messaging service (IMS), which is an online platform for real-time content communication between two or more users. Subscription services for various products may be provided in such services as the SNS and the IMS.

SUMMARY

According to an aspect, there is provided a method of providing a qualification authentication result performed by a user terminal including receiving a qualification authentication request for a user of the user terminal from an external device, performing access authentication to authentication information of a user account of the user in response to a selection input for the received qualification authentication request, and in response to the access authentication being successful, providing the external device with a qualification authentication result obtained by searching for target qualification information indicated by the qualification authentication request among qualification information registered in the authentication information of the user account.

The performing of the access authentication may include requesting an authentication input to the user in response to performing the access authentication, and determining whether the authentication input received from the user and registration information stored in advance in at least one of the user terminal and a server corresponding to the authentication information match The performing of the access authentication may include accessing the authentication information of the user account when the authentication input received from the user and the registration information match.

The providing the external device with the qualification authentication result may include requesting a server in which the authentication information of the user account is stored to search for the target qualification information indicated by the qualification authentication request.

The receiving of the qualification authentication request may include receiving a qualification authentication request message including metadata for designating a qualification type from the external device as the qualification authentication request.

The providing the external device with the qualification authentication result may include searching for qualification information corresponding to the designated qualification type as the target qualification information by using the metadata included in the qualification authentication request message from among the qualification information registered in the authentication information of the user account.

The external device may be one of another user terminal and an electronic device for a service operated by a service provider.

The receiving of the qualification authentication request may include receiving the qualification authentication request for requesting authentication for the same qualification type to the user account and another user account in a chat room in which the user account and the other user account participate.

The method of providing the qualification authentication result performed by the user terminal according to an example embodiment may further include, in response to a case in which the target qualification information indicated by the qualification authentication request is searched from the qualification information registered in the authentication information of the user account, receiving a website address to which users having the target qualification information are allowed to access from the external device.

According to another aspect, there is provided an user terminal including a communicator and a processor configured to receive a qualification authentication request for a user of the user terminal from an external device, perform access authentication to authentication information of a user account of the user in response to a selection input for the received qualification authentication request, and in response to the access authentication being successful, provide the external device with a qualification authentication result obtained by searching for target qualification information indicated by the qualification authentication request among qualification information registered in the authentication information of the user account.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
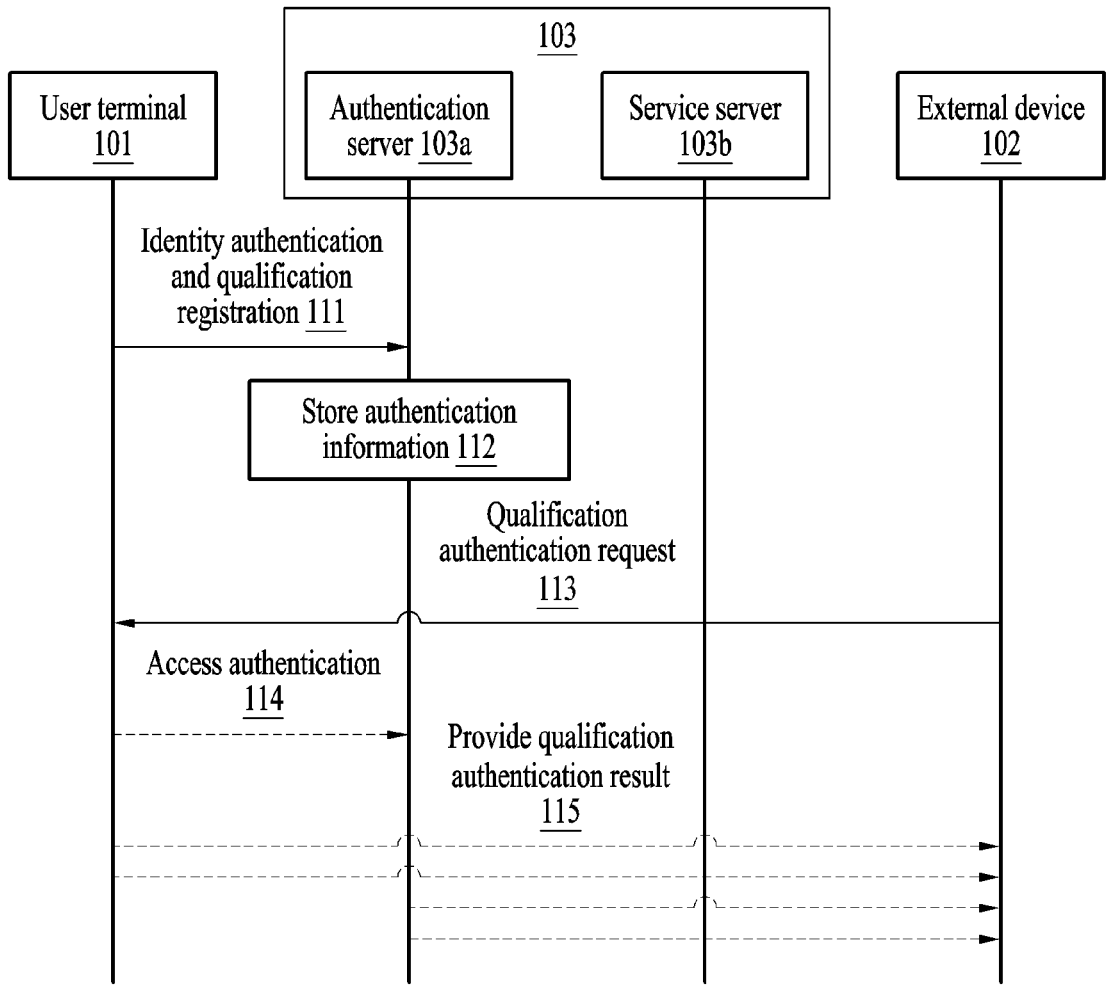
FIG. 1 is a diagram illustrating a method of transferring qualification information according to an example embodiment.

Predetermined structural or functional descriptions of the example embodiments are disclosed for purposes of illustration only, and may be changed and implemented in various aspects. Accordingly, the actually implemented aspect is not construed as limited to the predetermined example embodiments disclosed, and the scope of the present specification includes all changes, equivalents, or replacements included in the technical spirit described in the example embodiments.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected to another component or that still other component is interposed between the two components.

As used herein, the singular forms "a," "an," and "the" are intended to include the plural forms as well, unless the context clearly indicates otherwise. It will be further understood that the terms "comprise" and/or "include," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a diagram illustrating a method of transferring a qualification authentication result according to an example embodiment.

Referring to FIG. 1, a server 103 according to an example embodiment may include an authentication server 103a and a service server 103b. The authentication server 103a may perform identity authentication and qualification registration to be described later, and the service server 103b may include a server that provides the IMS or the SNS. The authentication server may also be referred to as an account server. Although the authentication server 103a and the service server 103b are separately illustrated in FIG. 1, the authentication server 103a and the service server 103b may be not limited thereto, and may be integrally implemented.

A user terminal 101 may be one of electronic devices such as a computer, a portable computer, a wireless phone, a mobile phone, smart phone, a personal digital assistants (PDA), and a web tablet, and may represent any device capable of installing and executing a service application related to the server 103. In this case, the user terminal 101 may perform overall service operations such as configuration of the service screen, data input, data transmission/reception, data storage, and the like under the control of the application, for example, the user terminal 101 may access the server through the application. Similarly to the user terminal 101, an external device 102 may represent any device capable of installing and executing a service application related to the server 103. For example, the user terminal 101 may perform a process for the identity authentication and the qualification registration related to the service with the authentication server 103a, and may be provided with a service from the service server 103b.

A user account is created by subscribing to the service provided by the service server 103b, and the service server 103b may serve as a service platform that provides services to user accounts that subscribe to the services such as the SNS, the IMS, and the like. In this specification, the user account is mainly described as an account subscribed to the IMS.

Since the user terminal 101 is provided with a service using a user account, the user account included in the following example embodiments may be interpreted as substantially meaning the user terminal 101. The user may create a profile including user identification information corresponding to the user account through the service server 103b. The profile corresponding to the user account may be displayed on the user terminal 101 through the profile interface. The authentication information may be mapped to the user account, which will be described later.

The method of transferring the qualification authentication result performed by the user terminal 101 according to an example embodiment may include performing the identity authentication and the qualification registration 111, storing the authentication information 112, receiving the qualification authentication request 113, performing access authentication to the authentication information of the user account 114, and providing the qualification authentication result 115.

The user subscribed to the service may perform the user authentication and the qualification registration with the authentication server 103a through the user terminal 101 in operation 111.

The user subscribed to the service may perform the identity authentication with the authentication server 103a through the user terminal 101. The identity authentication may represent an operation of authenticating whether personal information input by an arbitrary user and pre-registered personal information of a service user match. For example, the identity authentication may include a mobile phone identity authentication that identifies the actual owner of the name and resident number input from the user as the authentication server 103a transmits the authentication number to the user terminal opened in the name of the service user, and a identity authentication using a certificate issued in the name of the user using the service. The certificate may be an electronic certificate in which owner information is added to a public key (e.g., digital signature verification information) for identification and an electronic signature in electronic transactions, and may include a public certificate, a joint certificate, a browser certificate, and the like.

Next, the user subscribed to the service may perform qualification registration to the authentication server 103*a* after performing identity authentication to the authentication server 103*a* through the user terminal 101. The qualification registration is registration for proving identity, status, ability, and the like possessed by the user, and may include authentication for a certificate of a designated qualification type. The qualification type may represent the type of the certificate, and for example, may represent different certificates such as a student identification (ID), an employee ID, and a professional license (e.g., a lawyer's license and the like). The user may perform the qualification registration to the authentication server 103*a* for each qualification type.

In operation 112, the authentication server 103*a* may store authentication information. The authentication information may include personal information authenticated based on the user's identity authentication and registered qualification information based on the qualification registration, and may include, for example, the personal information and the qualification information. The personal information may represent personal information of the user authenticated through the identity authentication, and may include, for example, the user's real name, resident registration number, mobile phone number, and the like. The qualification information may represent information on a certificate possessed by the user authenticated through the qualification registration, for example, may include the type of the certificate, the name of the certificate, the certificate number (e.g., certificate registration number), the date of issue of the certificate, the name of the certificate holder, the date of birth of the certificate holder, and the validity period of the certificate.

The authentication server 103*a* may identify the user through the user's identity authentication, and may obtain personal information corresponding to the identified user's user account. The authentication server 103*a* may store and manage the personal information obtained in correspondence with the user account. The authentication server 103*a* may map the obtained personal information to the user account.

In addition, the authentication server 103*a* may obtain the qualification information corresponding to the user account of the user identified through the user's qualification registration with respect to the user identified through identity authentication. The authentication server 103*a* may store and manage the qualification information obtained in correspondence with the user account. The authentication server 103*a* may map the obtained qualification information to the user account.

The authentication information may be added to a profile of the user account subscribed to the IMS. According to an example embodiment, the authentication server 103*a* or the profile management server (not shown) may add the authentication information to the profile of the user account. The profile management server may be a server that manages the profiles of a plurality of user accounts subscribed to the IMS, and may be distinguished from the authentication server 103*a* and the service server 103*b*.

According to an example embodiment, the authentication server 103*a* may transmit authentication information mapped to the user account to the service server 103*b*. The service server 103*b* may add the authentication information received from the authentication server 103*a* to the profile of the user account.

According to another example embodiment, the authentication server 103*a* may transmit the authentication information mapped to the user account to the profile management server. The profile management server may directly add the authentication information received from the authentication server to the profile of the user account.

According to another example embodiment, the authentication server 103*a* may transmit the authentication information mapped to the user account to the profile management server. The profile management server may transmit the authentication information mapped to the user account to the service server 103*b*, and the service server 103*b* may add the authentication information received from the profile management server (not shown) to the profile of the user account.

The user terminal 101 may display the authentication information added to the profile of the user account in the profile interface. For example, the user terminal 101 may display an interface object capable of identifying the user's qualification information among the authentication information mapped to the user account in the profile interface.

In operation 113, the user terminal 101 may receive a qualification authentication request for the user of the user terminal 101 from the external device 102. According to an example embodiment, the user terminal 101 may directly receive the qualification authentication request from the external device 102. According to another example embodiment, the user terminal 101 may receive the qualification authentication request from the external device 102 through the service server 103*b*. The qualification authentication request may represent an operation of requesting an authentication result for target qualification information. As will be described later, authentication of the target qualification information may be performed by the user terminal 101 or the authentication server 103*a*, and the authentication result may be provided to the external device 102. For example, the qualification authentication request may include a qualification authentication request message including metadata related to the qualification information. The qualification authentication request message may be an instant message provided through the IMS. In other words, the user terminal 101 may receive the qualification authentication request message including the metadata from the external device 102 as the qualification authentication request. The metadata may represent data that provides information about data. As will be described later, the user terminal 101 may receive the qualification authentication request message including the metadata for designating the qualification type from the external device.

In operation 114, the user terminal 101 may perform access authentication for accessing the authentication information of the user account. For example, the user terminal 101 may perform the access authentication for accessing the authentication information in response to a selection input for the qualification authentication request. The access authentication may represent authentication for determining whether to allow access to the authentication information. The access to the authentication information may represent access to the authentication information mapped to the user account stored in the authentication server 103*a*.

The access authentication may represent an operation of determining whether an authentication input received from the user to access the authentication information and registration information stored in advance in association with the user account match. The registration information associated with the user account may be stored in at least one of the user terminal 101 and the authentication server 103*a* in advance.

According to an example embodiment, the user terminal 101 may transmit a request for accessing the authentication information stored in the authentication server 103*a* to the authentication server 103*a* as shown in FIG. 1. In this case, the access authentication may be performed in the authentication server 103a. When the access authentication is performed in the authentication server 103a, the access authentication may include an operation in which the user terminal 101 transmits an authentication input received from the user to the authentication server 103a and requests an inquiry of whether to register, an operation in which the authentication server 103a determines whether or not matching between the authentication input received from the user terminal 101 and the registration information stored in advance in association with the user account in the authentication server 103a, and operation of transmitting the matching result to the user terminal 101. For example, the authentication server 103a may allow access to the authentication information stored in the authentication server 103a of the user terminal 101 when the access authentication succeeds as the authentication input received from the user terminal 101 matches the registration information stored in advance in association with the user account. On the contrary, when access authentication fails since the authentication input received from the user terminal 101 and registration information do not match, the authentication server 103a may not allow access to the authentication information stored in the authentication server 103a of the user terminal 101.

According to another example embodiment, the user terminal 101 may perform the access authentication by itself. When the access authentication is performed in the user terminal 101, the access authentication may include an operation of determining whether the authentication input received from the user matches the registration information stored in advance in the user terminal 101. The user terminal 101 may transmit the matching determination result for the authentication input and the registration information to the authentication server 103a.

For example, when the authentication server 103a receives the matching determination result representing that the authentication input and pre-stored registration information match from the user terminal 101, the authentication server 103a may transmit the authentication information of the user account stored in the authentication server 103a to the user terminal 101. The user terminal 101 may receive the authentication information of the user account from the authentication server 103a. As a result, when the authentication input matches the pre-stored registration information, the user terminal 101 may allow access to the authentication information of the user account received from the authentication server 103a.

Conversely, when the authentication server 103a receives the matching determination result that the authentication input and the pre-stored registration information do not match from the user terminal 101, the authentication server 103a may not transmit the authentication information of the user account stored in the authentication server 103a to the user terminal 101. As a result, when the authentication input and the pre-stored registration information do not match, the user terminal 101 may exclude access to the authentication information of the user account because the user terminal 101 cannot receive the authentication information of the user account from the authentication server 103a.

The pre-stored registration information and authentication input may be, for example, a personal identification number (PIN) and/or biometric information of the user (e.g., fingerprint, face, iris, and vein, etc).

In operation 115, the qualification authentication result according to the qualification authentication request may be provided to the external device.

According to an example embodiment, the user terminal 101 may directly transmit the qualification authentication result to the external device 102. According to another example embodiment, the authentication server 103a may directly transmit the qualification authentication result to the external device 102. According to another example embodiment, the authentication server 103a or the user terminal 101 may transmit the qualification authentication result to the external device 102 via the service server 103b. For example, the authentication server 103a may transmit the qualification authentication result to the user terminal 101 based on an instant message based on the IMS.

The qualification authentication result may represent a result of qualification authentication performed by the authentication server 103a. The user terminal 101 may access authentication information mapped to the user account of the authentication server 103a.

According to an example embodiment, the user terminal 101 may transmit target qualification information indicated by the qualification authentication request to the authentication server 103a. The authentication server 103a may perform the qualification authentication by comparing the authentication information mapped to the user account with the target qualification information received from the user terminal 101. In other words, the authentication server 103a may perform the qualification authentication by searching for the target qualification information among qualification information registered in the authentication information of the user account. The authentication server 103a may obtain the qualification authentication result according to the qualification authentication. For example, the authentication server 103a may transmit the qualification authentication result to the user terminal 101. The user terminal 101 may transmit the qualification authentication result received from the authentication server 103a to the external device 102. In this case, the user terminal 101 may transmit the qualification authentication result to the external device 102 via the service server 103b. As another example, the authentication server 103a may directly transmit the qualification authentication result according to the qualification authentication to the external device 102. In this case, the authentication server 103a may transmit the qualification authentication result to the external device 102 via the service server 103b.

According to another example embodiment, the user terminal 101 may access the authentication information of the user account stored in the authentication server 103a, and perform the qualification authentication by searching for the target qualification information among the qualification information registered in the authentication information. The user terminal 101 may obtain the qualification authentication result according to the qualification authentication. The user terminal 101 may directly transmit the qualification authentication result to the external device 102. In this case, as described above, the user terminal 101 may transmit the qualification authentication result to the external device 102 via the service server 103b.

According to an example embodiment, the qualification authentication result may include information on whether the target qualification information indicated by the qualification authentication request among the the qualification information registered in the authentication information exists. For example, the authentication server 103a or the user terminal 101 may provide information that the target qualification information exists to the external device 102, when the target qualification information indicated by the qualification authentication request among the the qualification information registered in the authentication information exists. When the target qualification information indicated by the qualification authentication request does not exist among the qualification information registered in the authentication information, the authentication server 103*a* or the user terminal 101 may provide information indicating that the target qualification information does not exist to the external device 102.

As another example, when the target qualification information indicated by the qualification authentication request exists among the qualification information registered in the authentication information, the authentication server 103*a* or the user terminal 101 may provide the information indicating that the target qualification information exists and personal information (e.g., date of birth, etc.) of the user to the external device 102.

For another example, when the target qualification information indicated by the qualification authentication request among the qualification information registered in the authentication information exists, the authentication server 103*a* or the user terminal 101 may provide the target qualification information (e.g., the certificate number, certificate registration number and the like) to the external device 102.

The user terminal 101 may determine the target qualification information indicated by the qualification authentication request using the metadata included in the qualification authentication request message, which will be described later.

Figure 2:
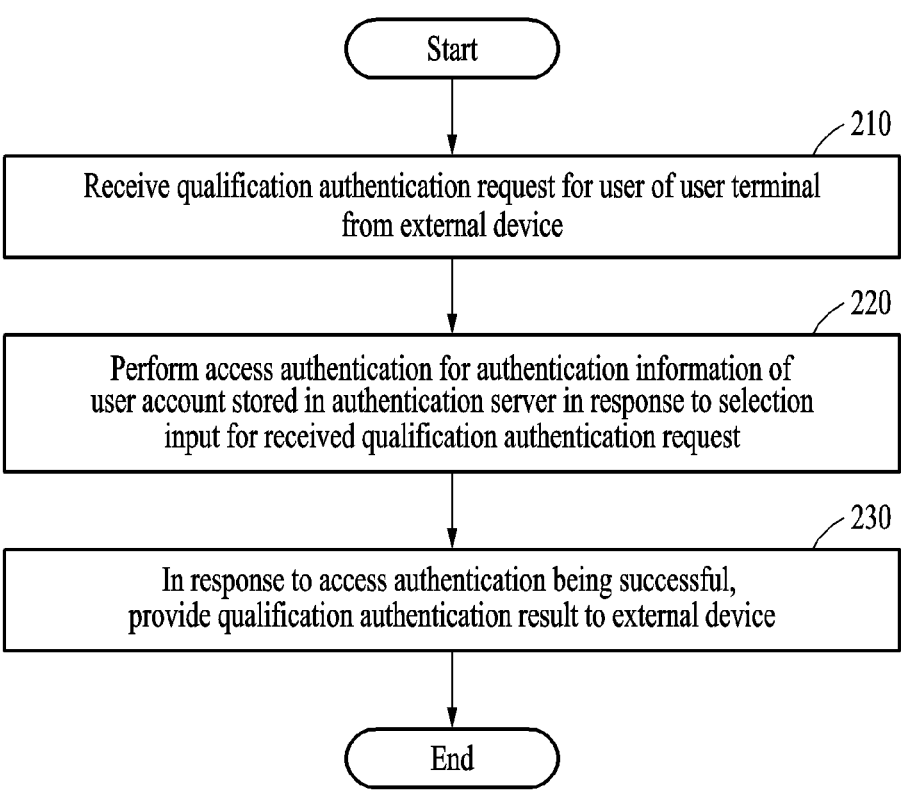
FIG. 2 is a flowchart illustrating a method of operating a user terminal for transferring a qualification authentication result according to an example embodiment.

FIG. 2 is a flowchart illustrating a method of operating a user terminal for transferring a qualification authentication result according to an example embodiment.

In operation 210, the user terminal 101 may receive the qualification authentication request for the user of the user terminal 101 from the external device. The user terminal 101 may perform the identity authentication and the qualification registration with the authentication server 103*a* in advance before receiving the qualification authentication request from the external device. The authentication server 103*a* may map the authentication information including personal information and qualification information of the user to the user account.

According to an example embodiment, the qualification authentication request received by the user terminal 101 may be the qualification authentication request message including the metadata designating the qualification type. For example, the user terminal 101 may receive the qualification authentication request message as an instant message through the IMS. For example, the metadata included in the qualification authentication request message may include a code corresponding to the qualification type. The user terminal 101 may determine the qualification type designated by the corresponding metadata based on the code included in the metadata. The user terminal 101 may determine target qualification information requested by the external device based on the metadata included in the received qualification authentication request message.

In operation 220, the user terminal 101 may perform access authentication for the authentication information of the user account stored in the authentication server 103*a* in response to a selection input for the received qualification authentication request.

The user terminal according to an example embodiment may access the authentication information of the user account stored in the authentication server 103*a* in order to provide the qualification authentication result according to the received qualification authentication request to the external device. Accordingly, the user terminal 101 according to an example embodiment may perform the access authentication for accessing the authentication information of the user account stored in the server. As described above, the access authentication may be performed in the authentication server 103*a* or may be performed in the user terminal 101.

In response to access authentication being successful, the qualification authentication result may be provided to the external device in operation 230.

When the access authentication is successful, the user terminal 101 according to an example embodiment may access the authentication information mapped to the user account of the authentication server 103*a*. As described above, the authentication information mapped to the user account may include authentication information obtained by the authentication server 103*a* by performing the identity authentication and the qualification registration to the authentication server in advance before the user terminal 101 receives the qualification authentication request. Furthermore, the authentication information mapped to the user account may further include the authentication information obtained by the authentication server 103*a* through the identity authentication and the qualification registration of the user terminal 101 to the authentication server 103*a* even after the user terminal 101 receives the qualification authentication request before the user terminal accesses the authentication information and searches the qualification information.

The user terminal 101 according to an example embodiment may determine the qualification type designated by the metadata included in the received qualification authentication request. The user terminal 101 or the authentication server 103*a* may search for the target qualification information associated with the determined qualification type from the qualification information registered in the authentication information of the user account. For example, when the qualification type designated by the metadata included in the qualification authentication request received by the user terminal 101 is the 'lawyer' certificate, the target qualification information related to the 'lawyer' qualification type may be searched from the qualification information registered in the authentication information of the user account. When the target qualification information associated with the 'lawyer' qualification type is searched from the qualification information registered in the authentication information of the user account, the user terminal 101 or the authentication server 103*a* may transmit the qualification authentication result including the information that the target qualification information exists to the external device.

Furthermore, there may be a plurality of qualification types designated by metadata included in the qualification authentication request. The user terminal 101 or the authentication server 103*a* may search for qualification information for each of the plurality of qualification types determined based on the metadata among the qualification information registered in the authentication information of the user account. For example, when all of the qualification information for each of the plurality of qualification types is searched from the qualification information registered in the authentication information of the user account, the user terminal 101 or the authentication server 103*a* may transmit the qualification authentication result including information that all of the target qualification information exists to the external device. As another example, when only the qualification information for some of the plurality of qualification types is searched from the qualification information registered in the authentication information of the user account, the user terminal 101 or the authentication server 103*a* may transmit information that only the qualification information for some qualification types exists to the external device.

According to an example embodiment, the external device may be one of electronic devices for services operated by other user terminals and service providers. For example, the external device may be a user terminal different from the user terminal receiving the qualification authentication request. As another example, the external device may be an electronic device for operating a business channel service. The business channel may represent a channel for a business operated by a business operator, a brand, an institution, a celebrity, or the like. In this specification, the user terminal is mainly described as an example of an external device that transmits a qualification authentication request, but the present disclosure is not limited thereto, and the external device may be an electronic device for operating the business channel service.

Figure 3:
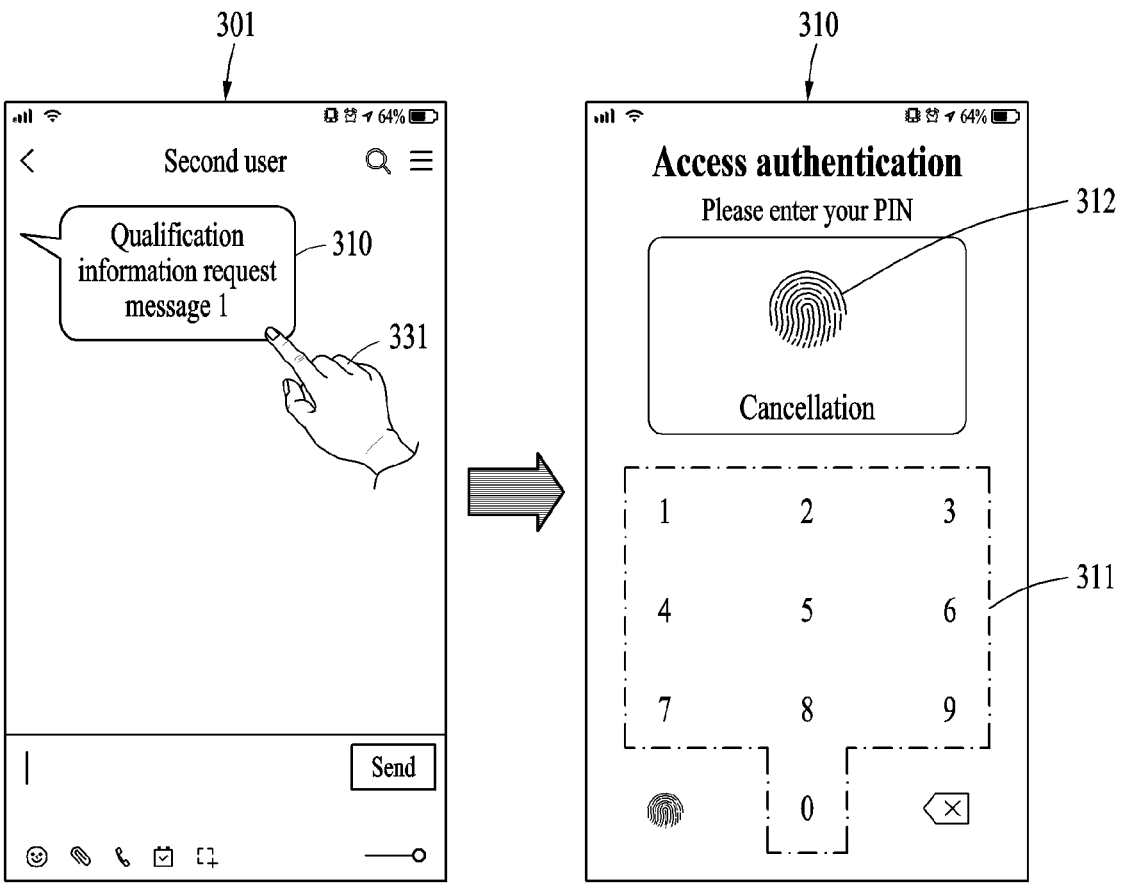
FIG. 3 illustrates a process of providing a qualification authentication result to an external device when a qualification authentication request message is received from an external device through an IMS.

FIG. 3 illustrates a process of providing a qualification authentication result to an external device when a qualification authentication request message is received from an external device through an IMS.

According to an example embodiment, the first user terminal may output a screen 301 corresponding to a chat room displaying an instant message with the second user account on a display. According to an example embodiment, the first user terminal may receive the qualification authentication request message 310 as the qualification authentication request from the second user terminal of the second user account through the IMS. For example, the qualification authentication request message 310 transmitted by the second user terminal may be displayed on the screen 301 corresponding to the chat room displaying the instant message with the second user account of the first user terminal. As shown in FIG. 3, the graphic form of the qualification authentication request message 310 received by the first user terminal may be in the form of a speech bubble. However, the present disclosure is not limited thereto, and the graphic form of the message may be a graphic form distinct from the speech bubble. For example, the graphic form of the qualification authentication request message may be in the form of a rectangle.

The first user terminal may perform access authentication for the authentication information of the first user account of the first user in response to a selection input for the qualification authentication request received from the second user terminal. For example, the selection input for the qualification authentication request of the first user terminal may represent the touch input 331 for the qualification authentication request message 310 of the first user. The first user terminal may perform the access authentication for authentication information of the first user account stored in the authentication server 103a.

In response to detecting the selection input for the received qualification authentication request, the first user terminal may perform the access authentication for the authentication information of the first user account of the first user. According to an example embodiment, the first user terminal may provide an interface 310 for access authentication at the timing of detecting the touch input 331 for the qualification authentication request message 310 described illustrated in FIG. 3 before accessing the authentication information of the first user account stored in the server (e.g., the authentication server 103a in FIG. 1).

According to an example embodiment, the first user terminal may request an authentication input to the first user in response to performing the access authentication on the authentication information of the first user account. The authentication input may include, for example, a PIN input and a biometric input, and the registration information may include PIN registration information and biometric registration information.

For example, the first user terminal may provide a keypad 311 for the PIN input in the interface for access authentication. The first user terminal may determine whether the input PIN matches the registered PIN information pre-stored in the first user terminal and/or the server. As another example, the first user terminal may request an input of the biometric information 312 in the interface for access authentication. The first user terminal may determine whether the input biometric information (e.g., fingerprint) matches registered biometric information pre-stored in the user terminal and/or the server.

According to an example embodiment, when the authentication input received from the user and the registration information match each other, the first user terminal may be allowed to access the user's authentication information. When the authentication input received from the user and the registration information does not match, the first user terminal may be excluded from accessing the user's authentication information.

In response to access authentication being successful, the first user terminal may access authentication information of the first user account. According to an example embodiment, the first user terminal may access the authentication information of the first user account and perform the qualification authentication by searching for the target qualification information among the qualification information registered in the authentication information. According to another example embodiment, the first user terminal may transmit the target qualification information indicated by the qualification authentication request to the authentication server 103a, and the authentication server 103a may perform the qualification authentication by searching the target qualification information among the qualification information registered in the authentication information of the first user account.

The first user terminal or the authentication server 103a may transmit the qualification authentication result according to performing the qualification authentication from the external device to the external device. Hereinafter, various example embodiments of transmitting the qualification authentication result to the external device will be described.

According to an example embodiment, the first user terminal or the authentication server 103a may transmit the authentication result as a message to the chat room displaying the instant message with the second user account through the IMS. For example, the first user terminal or the authentication server 103a may transmit an instant message indicating that the target qualification information exists to the second user terminal, when the target qualification information indicated by the qualification authentication request is searched from the qualification information registered in the authentication information of the first user account. The first user terminal or the authentication server 103a may transmit an instant message indicating that the target qualification information does not exist to the second user terminal, when the target qualification information is not searched among the qualification information registered in the authentication information of the first user account.

According to another example embodiment, the first user terminal or the authentication server 103a may transmit the qualification authentication result to the second user terminal without using a message of the IMS. For example, the first user terminal or the authentication server 103a may transmit the qualification authentication result to the second user terminal, and the second user terminal may identify the qualification authentication result through an interface separate from the chat room displaying the instant message with the first user account. As another example, when the first user terminal or the authentication server 103a transmits the qualification authentication result to the second user terminal, the service server may display that the qualification authentication result has been transmitted by changing the character string in the qualification authentication request message 310.

Figure 4:
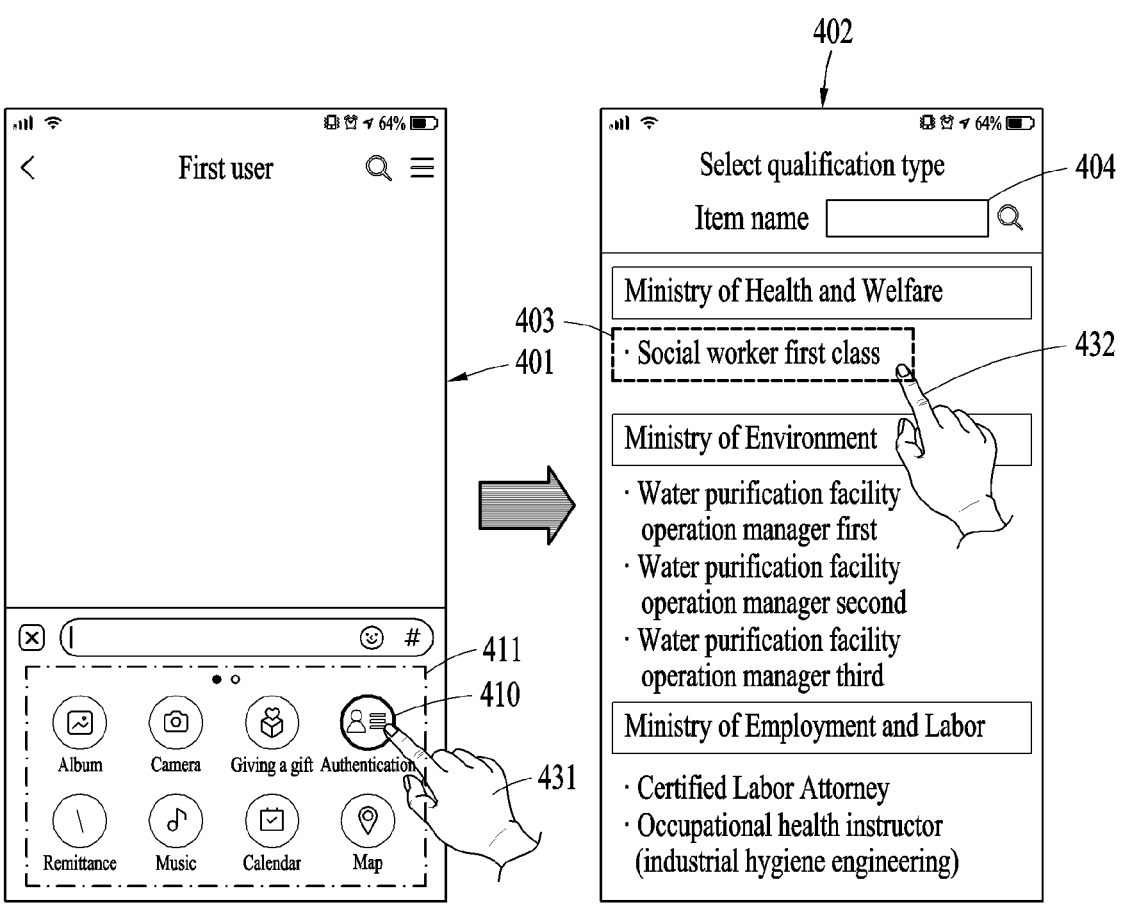
FIG. 4 illustrates an example of transmitting a qualification authentication request through an IMS.

FIG. 4 illustrates an example of transmitting a qualification authentication request through an IMS.

FIG. 4 illustrates a display of a second user terminal transmitting the qualification authentication request via the IMS. The second user terminal of the second user may output a screen 401 corresponding to the chat room displaying the instant message with the first user account of the first user on the display. The second user terminal may present additional menu items 411 to the second user. The additional menu items 411 may include an item related to a menu provided incidentally in addition to a character string input in a service application (e.g., an IMS application). The additional menu items 411 may include, for example, an authentication item 410.

The second user terminal may provide an interface 402 for selecting the qualification type in response to the second user's input (e.g., the authentication input 431) for the authentication item 410. The interface 402 for selecting the qualification type may include an interface object corresponding to each qualification type. For example, referring to FIG. 4, the interface object corresponding to each qualification type may be displayed separately for each qualification type managed by a government department. For another example, the interface object corresponding to each qualification type may be displayed separately for each industry field to which the corresponding qualification type belongs.

The second user of the second user terminal to which the second user terminal selects the qualification type may select at least one qualification type among the plurality of qualification types presented on the interface 402. For example, the selection input for at least one qualification type of the second user terminal may include a touch input 432 for at least one qualification type (e.g., 'social worker first class' type 403) of the second user. The second user terminal may generate the qualification authentication request message including the metadata designating the selected qualification type as the qualification authentication request. FIG. 4 illustrates that the second user terminal selects one qualification type as an example, but the second user terminal may select a plurality of qualification types.

The second user terminal may provide the qualification type search window 404 on the interface 402 for selecting the qualification type. The qualification type search window 404 may include an area in which a character string representing the qualification type of the target qualification information that the second user requests to provide to the first user may be input.

Figure 5A:
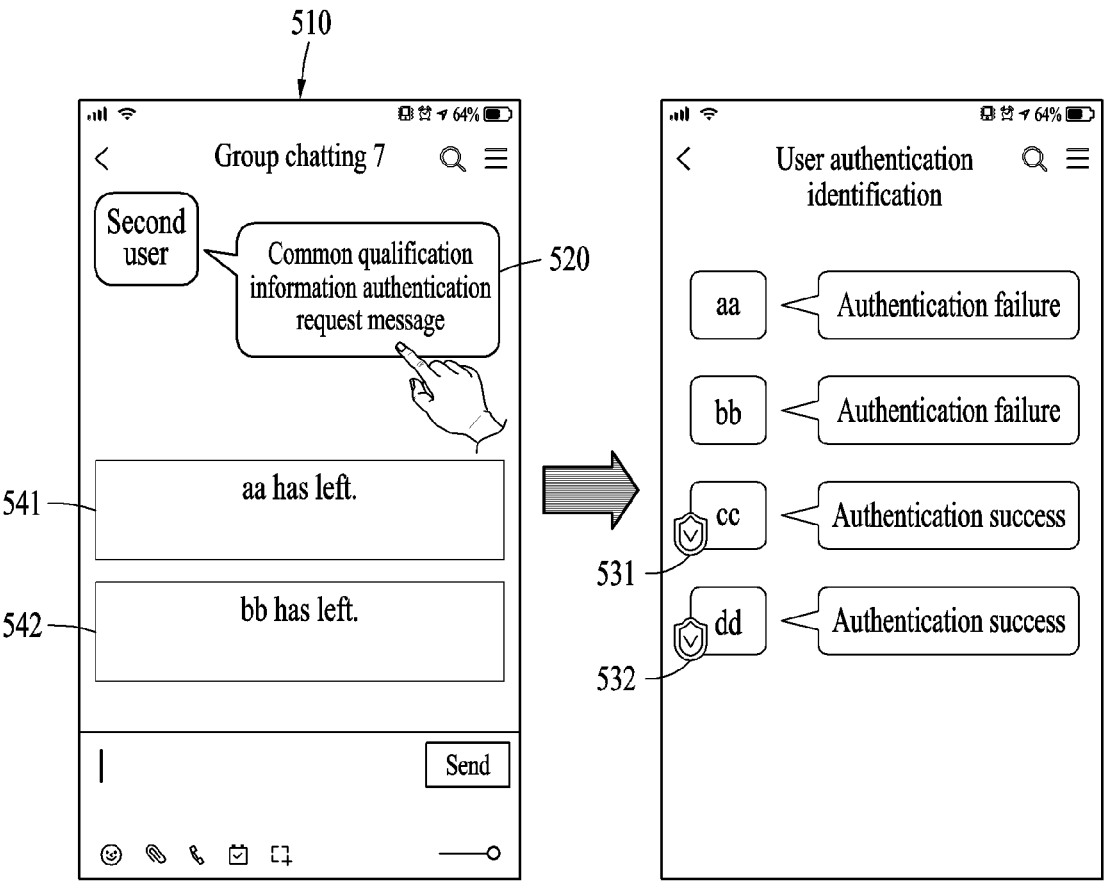
FIG. 5A and FIG. 5B illustrate an example in which a user terminal receives a qualification authentication request message in a chat room including a plurality of user accounts through an IMS.
Figure 5B:
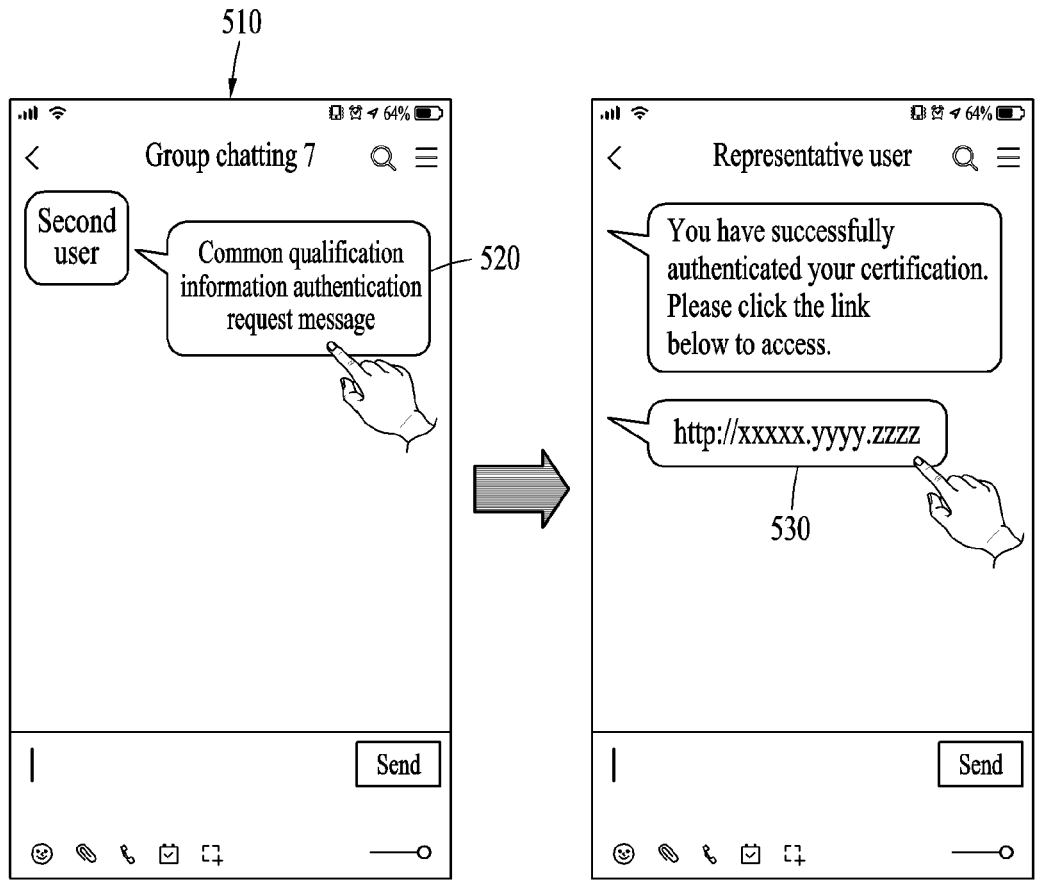

FIG. 5A and FIG. 5B illustrate an example in which a user terminal receives a qualification authentication request message in a chat room including a plurality of user accounts through an IMS.

The plurality of user accounts may include a first user account of the first user, a second user account of the second user, and a third user account of a third user different from the first user and the second user. The third user account may represent one user account among user accounts different from the first user account and the second user account among the plurality of user accounts. Hereinafter, a case in which the second user account transmits a common qualification authentication request message 520 as the qualification authentication request to both the second user account and other user accounts in the chat room including a plurality of user accounts will be described. In other words, in the chat room in which the first user account and another user account (e.g., a third user account) participate, the first user terminal according to an example embodiment may receive a common qualification authentication request for requesting authentication for the same qualification type to the first user account and the third user account from the second user terminal of the second user account.

Referring to FIG. 5A, the second user account may allow only user accounts for which the target qualification information indicated by the qualification authentication request is searched to stay in the chat room. A candidate user other than the second user may select the common qualification authentication request message 520 from the user terminal of the candidate user (hereinafter, 'target user terminal'). In response to detecting a selection input for the received qualification authentication request message, the candidate user terminal may perform access authentication for the authentication information of the candidate user account of the candidate user. The candidate user terminal or the authentication server may perform the qualification authentication by searching for target qualification information indicated by the qualification authentication request among the qualification information registered in the authentication information of the target user account. When the target qualification information is searched from the qualification information registered in the authentication information of the candidate user account, authentication marks 531 and 532 may be added to the candidate user account.

For example, the second user account may identify the qualification authentication result of another user included in the chat room. The authentication mark may not be added to a user account in which the target qualification information does not exist in the authentication information, and the authentication marks 531 and 532 may be added to a user account in which the target qualification information exists in the authentication information. The second user account may expel a user account for which the target qualification information indicated by the qualification authentication request in the authentication information is not searched from the chat room. In other words, the second user account may expel user accounts to which the authentication mark is not added from the chat room. Messages 541 and 542 that the user account for which the target qualification information indicated by the qualification information request is not searched is expelled from the chat room may be displayed on the display.

Referring to FIG. 5B, the second user account may allow only user accounts for which target qualification information indicated by the qualification authentication request are searched to participate in another chat room. The candidate user terminal of the candidate user other than the second user may perform access authentication. In response to a case in which the target qualification information indicated by the qualification authentication request is searched from the qualification information registered in the authentication information of the candidate user account, the second user account may transmit a website address which users who have the target qualification information are allowed to enter to the candidate user account. For example, the candidate user account may receive the message 530 including the website address in the chat room with the second user. According to another example embodiment, the candidate user terminal may perform operation of presenting a web view of the website in which the user having the target qualification information is allowed to enter on a display, in response to a case in which the target qualification information is searched from the authentication information of the candidate user account.

The user terminal according to an example embodiment may include a processor, the display, and a communication unit.

In response to the qualification authentication request received from the external device, the processor may provide the qualification authentication result according to the qualification authentication request to the external device. The processor may temporarily or permanently store data required to perform the method of transferring qualification information in memory.

The display may be, for example, a touch display in which a touch sensing module and a display module are integrally implemented.

The communication unit may establish a wired communication channel and/or a wireless communication channel with the external device (e.g., another electronic device and a server), for example, the communication unit may establish communication though telecommunication networks such as cellular communication, short-range wireless communication, local area network (LAN) communication, Bluetooth, wireless fidelity (WiFi) direct or infrared data association (IrDA), legacy cellular networks, 4G and/or 5G networks, next-generation communications, the Internet, or computer networks (such as LANs or wide area networks (WANs)).

The operation of each component of the server and the user terminal is not limited to the above, and the descriptions of the operations described above with reference to FIG. 1 to FIG. 6 may be applied to the server and the user terminal.

The example embodiments described above may be implemented by a hardware component, a software component, and/or a combination of a hardware component and a software component. For example, the devices, methods, and components described in the example embodiments may include, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions, may be implemented using a general purpose computer or special purpose computer. The processing device may execute an operating system (OS) and a software application running on the operating system. A processing device may also access, store, manipulate, process, and generate data in response to execution of the software. For convenience of understanding, although one processing device is described as being used in some cases, one of ordinary skill in the art may recognize that the processing device includes a plurality of processing elements and/or a plurality of types of processing elements. For example, the processing device may include a plurality of processors or one processor and one controller. In addition, other processing configurations are also possible, such as parallel processors.

Software may include a computer program, code, instruction, or a combination of one or more thereof, and may configure the processing device to operate as desired or may instruct the processing device independently or collectively. The software and/or data, to be interpreted by the processing device or to provide instructions or data to the processing device, may be permanently or temporarily embodied in any kind of machine, component, physical device, virtual equipment, computer storage medium, apparatus, or a transmitted signal wave. The software may be distributed over networked computer systems and stored or executed in a distributed manner. Software and data may be stored in one or more computer-readable recording media.

The method according to the example embodiment may be recorded in the form of program instructions that may be executed through various computer means and recorded in a computer-readable medium. The computer-readable medium may include program instructions, data files, data structures, etc. alone or in combination. The program instructions recorded on the medium may be specially designed and configured for the example embodiment, or may be known and available to those skilled in the art of computer software. Examples of the computer-readable recording medium include magnetic media such as hard disks, floppy disks and magnetic tapes, optical media such as CD-ROMs and DVDs, and magneto-optical media such as floptical disks, and hardware devices specially configured to store and execute program instructions, such as ROM, RAM, flash memory, and the like. Examples of program instructions include not only machine language codes such as those generated by a compiler, but also high-level language codes that may be executed by a computer using an interpreter or the like.

The hardware devices described above may be configured to operate as one or more software modules to perform the operations of the example embodiments, and vice versa.

As described above, although the example embodiments have been described with reference to the limited drawings, those skilled in the art may apply various technical modifications and variations based on the above. For example, even if the described techniques are performed in an order different from the described method, and/or the components of the described system, structure, apparatus, circuit, and etc. are combined or combined in a form different from the described method, or replaced or substituted by other components or equivalents, appropriate results may be achieved.

Therefore, other implementations, other example embodiments, and equivalents to the claims are also within the scope of the following claims.

What is claimed is:

1. A method of providing a qualification authentication result for a first user terminal, the method comprising:

providing, to the first user terminal and a second user terminal, a chat room;

receiving, from the second user terminal, a qualification authentication request for a user of the first user terminal;

receiving, from the first user terminal and in response to the qualification authentication request, a selection of one of a plurality of qualification options;

in response to authenticating the user of the first user terminal, determining, based on the selection of the one of the plurality of qualification options, a qualification authentication result by:

receiving, based on the selection of the one of the plurality of qualification options, based on a user account of the user, and based on a mapping of user accounts and qualification information, a certificate that uniquely identifies an identity of the user and a registration number corresponding to an association between the user and a legal entity; and based on determining that the certificate of the qualification authentication result indicates that qualification information registered in authentication information of the user account does not satisfy the qualification authentication request:

providing access, by the first user terminal, to the chat room; and causing display, in the chat room, of a message indicating that the user account does not satisfy the qualification authentication request.

2. The method of claim 1, wherein the authenticating the user of the first user terminal comprises:

requesting an authentication input to the user; and determining whether the authentication input received from the user and registration information stored in advance in at least one of the user terminal and a server corresponding to the authentication information match.

3. The method of claim 2, wherein the determining whether the authentication input received from the user and registration information stored in advance in at least one of the user terminal and a server corresponding to the authentication information match comprises accessing the authentication information of the user account when the authentication input received from the user and the registration information match.

4. The method of claim 1, wherein the association between the user and the legal entity corresponds to an employment status of the user.

5. The method of claim 1, wherein the qualification authentication request indicates a qualification type, and wherein the certificate corresponds to the qualification type.

6. The method of claim 1, further comprising:

providing access, by a third user terminal, to the chat room based on determining that second qualification information registered in second authentication information of a second user account corresponding to the third user terminal satisfies the qualification authentication request.

7. The method of claim 1, wherein the second user terminal comprises an electronic device for a service operated by a service provider.

8. The method of claim 1, wherein the receiving of the qualification authentication request comprises receiving the qualification authentication request via the chat room.

9. The method of claim 8, wherein the sending the identification of the user account of the user comprises:

outputting an address to a website to which users are allowed to access from the first user terminal; and searching for the qualification information based on access to the website.

10. A computing device configured to provide a qualification authentication result for a first user terminal, the computing device comprising:

one or more processors; and memory storing instructions that, when executed by the one or more processors, cause the computing device to:

provide, to the first user terminal and a second user terminal, a chat room;

receive, from the second user terminal, a qualification authentication request for a user of the first user terminal;

receive, from the first user terminal and in response to the qualification authentication request, a selection of one of a plurality of qualification options;

in response to authenticating the user of the first user terminal, determine, based on the selection of the one of the plurality of qualification options, a qualification authentication result by:

receiving, based on the selection of the one of the plurality of qualification options, based on a user account of the user, and based on a mapping of user accounts and qualification information, a certificate that uniquely identifies an identity of the user and a registration number corresponding to an association between the user and a legal entity; and based on determining that the certificate of the qualification authentication result indicates that qualification information registered in authentication information of the user account does not satisfy the qualification authentication request:

provide access, by the first user terminal, to the chat room; and cause display, in the chat room, of a message indicating that the user account does not satisfy the qualification authentication request.

11. The computing device of claim 10, wherein the instructions, when executed by the one or more processors, cause the computing device to authenticate the user of the first user terminal by causing the computing device to:

request an authentication input to the user; and determine whether the authentication input received from the user and registration information stored in advance in at least one of the user terminal and a server corresponding to the authentication information match.

12. The computing device of claim 11, wherein the instructions, when executed by the one or more processors, cause the computing device to determine whether the authentication input received from the user and registration information stored in advance in at least one of the user terminal and a server corresponding to the authentication information match by accessing the authentication information of the user account when the authentication input received from the user and the registration information match.

13. The computing device of claim 10, wherein the association between the user and the legal entity corresponds to an employment status of the user.

14. The computing device of claim 10, wherein the qualification authentication request indicates a qualification type, and wherein the certificate corresponds to the qualification type.

15. The computing device of claim 10, wherein the instructions, when executed by the one or more processors, cause the computing device to:

provide access, by a third user terminal, to the chat room based on determining that second qualification information registered in second authentication information of a second user account corresponding to the third user terminal satisfies the qualification authentication request.

16. One or more non-transitory computer-readable media storing instructions configured to provide a qualification authentication result for a first user terminal, wherein the instructions, when executed by one or more processors of a computing device, cause the computing device to:

provide, to the first user terminal and a second user terminal, a chat room;

receive, from the second user terminal, a qualification authentication request for a user of the first user terminal;

receive, from the first user terminal and in response to the qualification authentication request, a selection of one of a plurality of qualification options;

in response to authenticating the user of the first user terminal, based on the selection of the one of the plurality of qualification options, a qualification authentication result by:

receiving, based on the selection of the one of the plurality of qualification options, based on a user account of the user, and based on a mapping of user accounts and qualification information, the qualification authentication result by identifying a certificate that uniquely identifies an identity of the user and a registration number corresponding to an association between the user and a legal entity; and based on determining that the certificate of the qualification authentication result indicates that qualification information registered in authentication information of the user account does not satisfy the qualification authentication request:

provide access, by the first user terminal, to the chat room; and cause display, in the chat room, of a message indicating that the user account does not satisfy the qualification authentication request.

17. The one or more non-transitory computer-readable media of claim 16, wherein the instructions, when executed by the one or more processors, cause the computing device to authenticate the user of the first user terminal by causing the computing device to:

request an authentication input to the user; and determine whether the authentication input received from the user and registration information stored in advance in at least one of the user terminal and a server corresponding to the authentication information match.

18. The one or more non-transitory computer-readable media of claim 17, wherein the instructions, when executed by the one or more processors, cause the computing device to determine whether the authentication input received from the user and registration information stored in advance in at least one of the user terminal and a server corresponding to the authentication information match by accessing the authentication information of the user account when the authentication input received from the user and the registration information match.

19. The one or more non-transitory computer-readable media of claim 16, wherein the association between the user and the legal entity corresponds to an employment status of the user.

20. The one or more non-transitory computer-readable media of claim 16, wherein the qualification authentication request indicates a qualification type, and wherein the certificate corresponds to the qualification type.

\* \* \* \* \*